3,574,838
6-SULFAMOYL - 2,3 - DICHLOROQUINOXALINE COMPOSITIONS AND METHOD OF TREATING GASTRIC HYPERACIDITY
William A. Bolhofer, Frederick, and John J. Baldwin, Lansdale, Pa., assignors to Merck & Co., Inc., Rahway, N.J.
No Drawing. Filed Dec. 28, 1966, Ser. No. 605,207
Int. Cl. A61k 27/00
U.S. Cl. 424—250                    14 Claims

ABSTRACT OF THE DISCLOSURE

There is disclosed a method of treating gastric hyperacidity with 2,3-dichloroquinoxalines wherein the 6-position of the quinoxaline ring contains a sulfamoyl or substituted sulfamoyl radical and the 7-position may be substituted with chlorine, a loweralkyl or loweralkoxy substituent. Formulations containing these substances as active ingredients are also disclosed.

---

This invention relates generally to methods for the treatment of gastric hyperacidity in mammals. In addition, it is concerned with novel compositions useful in inhibiting the secretion of gastric acid. More particularly it relates to the use of 2,3-dichloroquinoxalines wherein the 6-position contains a substituted sulfamoyl radical for the treatment of peptic ulcers and with novel compositions containing said substances.

The presence of peptic ulcers is rather common in the population. The cause of this condition is still obscure, but hypersecretion of acid gastric juice is considered to be an important factor in the production of duodenal ulcers and in the reactivation of healed ulcers. Peptic ulcers occasionally develop at the lower end of the esophagus, but the majority occur on the lesser curvature of the stomach or in the first portion of the duodenum, causing a burning sensation, and which, if left untreated, may perforate, causing hemorrhaging and possibly death.

One of the basic principles presently accepted in healing peptic ulcers is the suppression of gastric secretory hyperactivity. It is in this area wherein therapy has been shown to be of value. The preferred products heretofore and currently used to control gastric acidity are mainly anticholinergic agents or antacids. The anticholinergic agents have the disadvantage in that they act by or through the nervous system by blocking the nerve impulses to the cells of the gastric mucosa responsible for secretion of acid. Because of this effect on the nervous system the anticholinergic agents are nonspecific, additionally affecting other secretory mechanisms of the body as well as other body functions dependent in whole or in part on stimulation by the nervous system. The antacid compounds, on the other hand, have limited effectiveness as they act only to neutralize the acid after it has been secreted into the stomach, and furthermore, have a short duration of activity and are prone to cause what is known as acid rebound.

We have now found that certain quinoxaline compounds, and more particularly 2,3-dichloroquinoxaline compounds wherein the 6-position contains a substituted sulfamoyl radical, have the unique ability to inhibit gastric acid secretion. Many of these quinoxaline compounds have been previously described and prepared, but their use as gastric acid inhibitors has never been heretofore suggested. One of the unique characteristics of this class of anti-secretary agents is that their ability to inhibit gastric acid secretion is not due to anticholinergic activity or antacid effect, but control of acid secretion at the cellular level of the gastric mucosa.

One object of the present invention, therefore, is to provide a new method for controlling and treating peptic ulcers. A further object is provision of novel compositions containing these acid-secreting inhibitors, which may be administered orally to individuals suffering from chronic gastric hyperacidity. Other objects will become apparent from the following description of the invention.

The novel compositions contemplated within the scope of this invention have as an active ingredient 6-(substituted sulfamoyl) - 2,3 - dichloroquinoxaline, having the structural formula

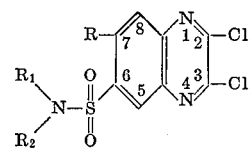

wherein R represents hydrogen, chlorine, loweralkyl, or a loweralkoxy group; $R_1$ and $R_2$ each may represent hydrogen,
loweralkyl,
cycloloweralkyl,
alkenyl,
hydroxy substituted alkyl,
phenyl substituted alkyl,
loweralkoxyloweralkyl,
haloloweralkyl,
phenylhydroxyloweralkyl,
dialkylaminoalkyl,
acylaminoloweralkyl, or loweralkyl substituted with a 5 or 6 membered heterocycle, containing one or more hetero atoms selected from the group consisting of oxygen, sulfur or nitrogen;

phenyl,
halophenyl,
loweralkoxyphenyl,
hydroxyloweralkylphenyl,
loweralkylphenyl,
alkynyl,
diloweralkylaminophenyl, or a 5 or 6 membered heterocycle, having at least one hetero atom selected from the group consisting of oxygen, sulfur or nitrogen; or $R_1$ and $R_2$ may be joined together to form a heterocyclic group which may have a hetero atom selected from the group consisting of oxygen, sulfur or nitrogen in addition to the hetero nitrogen attached to the sulfonyl function, and the hetero group may be substituted with a hydroxyl or a loweralkyl group.

When R represents loweralkyl, included are methyl, ethyl, propyl and butyl; and when loweralkoxy, included are methoxy, ethoxy, propoxy and butoxy.

$R_1$ and/or $R_2$ may represent loweralkyl, examples of which include methyl, ethyl, propyl, isobutyl, and hexyl. This loweralkyl group may be further substituted with a halogen atom such as chlorine or bromine; a phenyl radical; an acylamino radical represented by benzoylamino and loweralkanoylamino, the latter particularly exemplified by acetylamino, propionylamino, butyrylamino; a diloweralkylamino group such as dimethylamino, diethylamino and methylethylamino; an alkoxy group such as methoxy, ethoxy, or propoxy. The alkyl group may also be substituted by having attached to one of the carbon atoms a 5 or 6-membered heterocyclic radical such as pyridyl, pyrimidinyl, piperidyl, thiazolyl, isothiazolyl, thiadiazolyl, imidazolyl, morpholino, thiomorpholino, tetrahydrofuranyl and the like.

$R_1$ and/or $R_2$ may also represent a loweralkyl group substituted with one or more hydroxy groups in which case $R_1$ and/or $R_2$ may be hydroxyethyl, hydroxypropyl, 1-methyl-2-hydroxyethyl, dimethylhydroxyethyl, 2,3-dihydroxypropyl. Additionally, $R_1$ and/or $R_2$ may be a disubstituted loweralkyl group such as phenylhydroxyethyl or phenylhydroxypropyl, in which case the phenyl and hydroxy groups may be on the same or different carbon atoms of the alkyl chain.

In addition, $R_1$ and/or $R_2$ may be a phenyl group which may additionally be substituted with a halogen such as chlorine or bromine, a loweralkoxy group such as methoxy, ethoxy, or propoxy, a loweralkyl radical such as methyl, ethyl, propyl and butyl, or the phenyl group may be disubstituted with any two of the above-mentioned substituents, and they may be the same or different. Also, the phenyl group may be substituted with a diloweralkylamino group such as dimethylamino, diethylamino or dipropylamino; a hydroxyloweralkyl group, examples of which are hydroxyethyl, hydroxypropyl.

$R_1$ and/or $R_2$ may also be a cycloloweralkyl group such as cyclopropyl or cyclohexyl, or an unsaturated aliphatic hydrocarbon such as alkenyl, exemplified by 3-butenyl, 2-butenyl, allyl, and methallyl or alkynyl illustrated by propynyl, 2-butynyl or 3-butynyl.

Examples in which $R_1$ and/or $R_2$ is a heterocyclic radical are pyridyl, thiazolyl, isothiazolyl, imidazolyl, and pyrimidinyl.

$R_1$ and $R_2$ may be joined together to form a heterocyclic group incorporating the sulfamoyl nitrogen atom as exemplified by morpholino, thiomorpholino, piperidyl, piperazino and imidazolyl, hydroxypiperidinyl and methyl piperazino.

The active ingredient of the compositions effective in inhibiting gastric acid secretion, 6-(substituted sulfamoyl)-2,3-dichloroquinoxalines, may be prepared by intimately contacting an appropriately substituted amine with 6-chlorosulfonyl-2,3-dichloroquinoxaline. When 6-chlorosulfonyl-7-(chloro, loweralkyl or loweralkoxy)-2,3-dichloroquinoxaline is reacted with an amine, a 6-(substituted sulfamoyl)-7-(chloro, loweralkyl or loweralkoxy)-2,3-dichloroquinoxaline may be obtained.

The reaction may be schematically represented as follows:

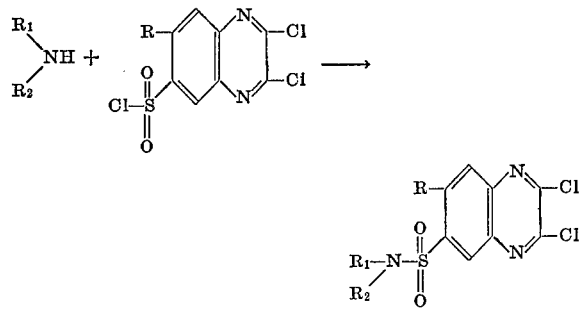

wherein $R_1$ and $R_2$ are as previously described.

As will be realized by one skilled in the art, if the amine starting reactant schematically represented above has a basic substituent in the molecule, the quinoxaline obtained will be in the form of the hydrochloride salt. This hydrochloride salt may be subsequently converted to the free base by treating with a base, and if desired, converted to a different acid addition salt by treating the free base with acid such as citric acid, sulfuric acid, maleic acid, or tartaric acid.

The following examples are given by way of illustration, and not by way of limitation.

EXAMPLE 1

A solution of 0.4 g., (0.0068 mole), of ethanolamine in 5 ml. of dioxane is added dropwise and with stirring at 27° C. to a solution of 1.0 g., (0.0034 mole) 6-chlorosulfonyl-2,3-dichloroquinoxaline in 10 ml. of dioxane. The mixture is stirred for twenty minutes and 100 ml. of water is added. 6-(2-hydroxyethylsulfamoyl)-2,3-dichloroquinoxaline precipitates, and is collected by filtration. The solid is recrystallized to give substantially pure material, M.P. 175–176° C.

A solution of 0.338 g., (0.0038 mole) of N-methylpiperazine in 5 ml. of dioxane is added dropwise with stirring at 25° C. to a solution of 1.0 g., (0.00338 mole) of 2,3-dichloro-6-chlorosulfonylquinoxaline in 10 ml. of dioxane. The hydrochloride salt of 6-(N-methylpiperazinosulfonyl)-2,3-dichloroquinoxaline precipitates and is collected by filtration. The solid is recrystallized from acetonitrile to give substantially pure material, M.P. above 350° C.

In a similar manner 6-(2-dimethylaminoethylsulfamoyl)-2,3-quinoxaline hydrochloride may be prepared by using 2-dimethylaminoethylamine in place of N-methylpiperazine. The 6-(2-dimethylaminoethylsulfamoyl)-2,3-dichloroquinoxaline hydrochloride obtained has a M.P. of 243–245° C.

The hydrochloride salt of 6-(N-methylpiperazinosulfonyl)-2,3-dichloroquinoxaline is converted to the free base by treating a suspension of the salt in ethyl acetate with a saturated aqueous solution of sodium bicarbonate.

Other 6-($R_1$, $R_2$-sulfamoyl)-2,3-dichloroquinoxalines may be obtained by reacting 6-chlorosulfonyl-2,3-dichloroquinoxaline with an appropriately substituted amine in a manner as described above. The corresponding 7-(chloro, loweralkyl or loweralkoxy)-6-(substituted sulfamoyl)-2,3-dichloroquinoxalines may be prepared by methods described by the prior art.

The active ingredient of this invention effectively inhibits acid secretion for a period of hours. For this reason the compositions, the subject of this invention, have special value in the treatment of peptic ulcers. While the preferred dose is a function of the specific active ingredient used and the individual requirements, generally the active ingredient, when orally administered in a total daily dose of from about 0.5–500 mg. with the preferred dose being from about 1–100 mg., has a very favorable therapeutic ratio.

The compositions contemplated within the scope of this invention include any suitable composition intended to be orally administered as in tablet, capsule, suspension, or other liquid or solid form. Thus, the novel compositions can be prepared by admixing the active ingredient with a suitable diluent such as lactose or starch and encapsulating, or tablets may be formed by combining the active ingredient with suitable binding and expanding agents and compressing into tablets. Liquid pharmaceutical composition suitable for oral administration may be obtained by dissolving or suspending the active ingredient in a suitable flavored vehicle.

Typical formulations for preparing tablets, capsules, and liquids containing the gastric acid inhibiting quinoxalines are described below. It should be recognized by one skilled in the art that the formulations represent only one method for making the desired pharmaceutical composition. Factors such as the desired size of the tablet or capsule will be a determining factor as to the amount of diluent required. The type of diluent will be determined by the hardness of the tablet desired, or whether they are to be made by the dry, wet, or direct compression method. Also to be considered is whether other active ingredients are to be included in the formulation, which may be of benefit in controlling hypergastric acidity in a secondary manner, such as the barbiturates and tranquilizers and the like.

EXAMPLE 2

[Tablet containing 25 mg. of 6-sulfamoyl-2,3-dichloroquinoxaline]

|  | Each tablet, mg. | 1,000 tablets, gm. |
| --- | --- | --- |
| 6-sulfamoyl-2,3-dichloroquinoxaline | 25 | 25 |
| Starch | 20 | 20 |
| Lactose (powder) | 20 | 20 |
| Talc | 5 | 5 |
| Wt. of granulation | 70 | 70 |

Mix all of the ingredients and then compress into slugs. The slugs should then be ground to form granules that will pass through a 14–16 mesh screen. The granules may then be re-compressed into tablets, using a suitable compression mold to form tablets, each weighing 70 mg.

Capsule containing 50 mg. of 6-sulfamoyl-2,3-dichloroquinoxaline

| | Mg. |
|---|---|
| 6-sulfamoyl-2,3-dichloroquinoxaline | 50 |
| Lactose | 150 |
| | 200 |

Mix the ingredients so as to evenly distribute the active ingredient throughout the lactose. Pack the powder into No. 2 empty gelatin capsules. Each capsule should have a net weight of 200 mg.

Suspension containing 5 mg. per 5 cc. of 6-sulfamoyl-2,3-dichloroquinoxaline 1,000 ml.

6-Sulfamoyl-2,3-dichloroquinoxaline—1 gm.
Tragacanth—30 gm.
Amaranth—10 gm.
Syrup wild cherry U.S.P.—600 ml.
Distilled water q.s. ad—1,000 ml.

Hydrate the tragacanth with sufficient water to form a smooth paste and to this add the 6-sulfamoyl-2,3-dichloroquinoxaline, followed by the Amaranth which has previously been dissolved in distilled water and the syrup of wild cherry. The suspension is then brought to a volume of 1,000 ml. with distilled water and stirred well to suspend the added materials. Each 5 ml. will contain 5 mg. of 6-sulfamoyl-2,3-dichloroquinoxaline.

We claim:

1. A process for inhibiting gastric acid secretion which comprises orally administering to an individual suffering from gastric hyperacidity from about 0.5 to 500 mg. per day of a compound of the formula

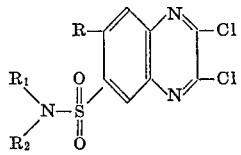

wherein
R represents hydrogen, chlorine, loweralkyl, or loweralkoxy, and
$R_1$ and $R_2$ each represent hydrogen, loweralkyl, cycloloweralkyl, alkenyl, alkynyl, substituted loweralkyl wherein the substituent is hydroxy, phenyl, phenylhydroxy, loweralkoxy, halo, loweralkanoylamino, benzoylamino, diloweralkylamino, or a 5 or 6 membered heterocycle having at least one hetero atom selected from the group consisting of oxygen, sulfur and nitrogen, phenyl, loweralkoxyphenyl, halophenyl, loweralkylphenyl, hydroxyloweralkylphenyl, diloweralkylaminophenyl, or a 5 or 6 membered heterocycle having at least one hetero atom selected from the group consisting of oxygen, sulfur and nitrogen; or
$R_1$ and $R_2$ are joined together to form a heterocyclic group having a hetero atom selected from the group consisting of oxygen, sulfur and nitrogen in addition to the hetero nitrogen attached to the sulfonyl function which hetero ring may be substituted with a hydroxyl or a loweralkyl group;
or an acid addition salt of said compound wherein the sulfamoyl radical contains a basic substituent.

2. The process of claim 1 wherein the compound is 6-loweralkylsulfamoyl-2,3-dichloroquinoxaline.

3. The process of claim 1 wherein the compound is 6-methylsulfamoyl-2,3-dichloroquinoxaline.

4. The process of claim 1 wherein the compound is 6-sulfamoyl-2,3-dichloroquinoxaline.

5. The process of claim 1 wherein the compound is 6-diloweralkylaminoloweralkylsulfamoyl - 2,3 - dichloroquinoxaline or an acid addition salt thereof.

6. The process of claim 1 wherein the compound is 6-(2 - dimethylaminoethylsulfamoyl) - 2,3 - dichloroquinoxaline or an acid addition salt thereof.

7. An antiulcer composition which comprises a solid, orally ingestible pharmaceutical carrier in dosage unit form containing as an antiulcer ingredient from about 25 to 50 mg. of a compound of the formula

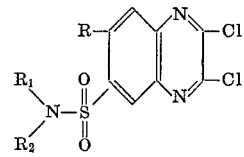

wherein
R represents hydrogen, chlorine, loweralkyl, or loweralkoxy and
$R_1$ and $R_2$ each represent hydrogen, loweralkyl, cycloloweralkyl, alkenyl, alkynyl, substituted loweralkyl wherein the substituent is hydroxy, phenyl, phenylhydroxy, loweralkoxy, halo, loweralkanoylamino, benzoylamino, diloweralkylamino, or a 5 or 6 membered heterocycle having at least one hetero atom selected from the group consisting of oxygen, sulfur and nitrogen, phenyl, loweralkoxyphenyl, halophenyl, loweralkylphenyl, hydroxyloweralkylphenyl, diloweralkylaminophenyl, or a 5 or 6 membered heterocycle having at least one hetero atom selected from the group consisting of oxygen, sulfur and nitrogen; or
$R_1$ and $R_2$ are joined together to form a heterocyclic group having a hetero atom selected from the group consisting of oxygen, sulfur and nitrogen in addition to the hetero nitrogen attached to the sulfonyl function which hetero ring may be substituted with a hydroxyl or a loweralkyl group;
or an acid addition salt of said compound wherein the sulfamoyl radical contains a basic substituent.

8. A composition of claim 7 wherein the active ingredient is 6-loweralkylsulfamoyl-2,3-dichloroquinoxaline.

9. A composition of claim 7 wherein the active ingredient is 6-methylsulfamoyl-2,3-dichloroquinoxaline.

10. A composition of claim 7 wherein the active ingredient is 6-sulfamoyl-2,3-dichloroquinoxaline.

11. A composition of claim 7 wherein the active ingredient is 6-(diloweralkylaminoloweralkylsulfamoyl)-2,3-dichloroquinoxaline or an acid addition salt thereof.

12. A composition of claim 7 wherein the active ingredient is 6-(2-dimethylaminoethylsulfamoyl)-2,3-dichloroquinoxaline or an acid addition salt thereof.

13. The process of claim 1 in which R is hydrogen.

14. The composition of claim 7 in which R is hydrogen.

References Cited

UNITED STATES PATENTS

| 3,040,046 | 6/1962 | Sasse et al. | 260—250 |
| 3,192,212 | 6/1965 | Santilli et al. | 260—250 |
| 3,223,706 | 12/1965 | Sasse et al. | 260—250 |

FOREIGN PATENTS

| 27,256 | 11/1964 | Japan | 424—250 |

OTHER REFERENCES

Chemical Abstracts, vol. 61, col. 15288, 1964.

ALBERT T. MEYERS, Primary Examiner

D. M. STEPHENS, Assistant Examiner

U.S. Cl. X.R.

424—248